United States Patent
Reid

(12) United States Patent (10) Patent No.: US 8,271,515 B2
Reid (45) Date of Patent: Sep. 18, 2012

(54) SYSTEM AND METHOD FOR PROVIDING COPYBACK DATA INTEGRITY IN A NON-VOLATILE MEMORY SYSTEM

(75) Inventor: Robert Alan Reid, Superior, CO (US)

(73) Assignee: Cadence Design Systems, Inc., San Jose, CA (US)

( * ) Notice: Subject to any disclaimer, the term of this patent is extended or adjusted under 35 U.S.C. 154(b) by 304 days.

(21) Appl. No.: 12/022,134

(22) Filed: Jan. 29, 2008

(65) Prior Publication Data

US 2009/0193058 A1 Jul. 30, 2009

(51) Int. Cl.
 *G06F 17/30* (2006.01)
(52) U.S. Cl. ........................................................ 707/768
(58) Field of Classification Search .................. None
 See application file for complete search history.

(56) References Cited

U.S. PATENT DOCUMENTS

| | | | | |
|---|---|---|---|---|
| 4,077,059 A * | 2/1978 | Cordi et al. | ................... | 711/122 |
| 7,187,583 B2 * | 3/2007 | Yang et al. | ............... | 365/185.09 |
| 7,958,430 B1 * | 6/2011 | Kolokowsky et al. | ........ | 714/763 |
| 2005/0172065 A1 * | 8/2005 | Keays | ........................... | 711/103 |
| 2007/0011513 A1 * | 1/2007 | Biswas et al. | ................. | 714/722 |
| 2007/0047306 A1 * | 3/2007 | Roohparvar | ............. | 365/185.09 |
| 2008/0068886 A1 * | 3/2008 | Kang et al. | ............... | 365/185.09 |

* cited by examiner

*Primary Examiner* — Yuk Ting Choi
(74) *Attorney, Agent, or Firm* — Sawyer Law Group, P.C.

(57) ABSTRACT

An invention is provided for affording CopyBack data integrity in a non-volatile memory system. When the potential for moving data with a CopyBack command occurs, a counter corresponding to the data is examined. When the counter is below a predetermined limit, the counter is incremented and data from the block of data is moved using a CopyBack command. However, when the counter reaches the predetermined limit, the counter is reset and data from the block of data is moved to system memory and examined for errors. Once any errors are corrected, the data is transferred back to the non-volatile memory.

20 Claims, 8 Drawing Sheets

SYSTEM AND METHOD FOR PROVIDING COPYBACK DATA INTEGRITY IN A NON-VOLATILE MEMORY SYSTEM

BACKGROUND OF THE INVENTION

1. Field of the Invention

This invention relates generally to non-volatile memory, and more particularly to providing data integrity when using the CopyBack command in a non-volatile memory system.

2. Description of the Related Art

In general, non-volatile memory is memory that stores data when power is disconnected from the system. Phase-change memory (PCM) and flash memory are examples of non-volatile computer memory in use today. Non-volatile memory is a non-volatile computer memory that can be electrically erased and reprogrammed. Because non-volatile memory retains stored data even when power to the memory is turned off, non-volatile memory is widely used in battery-driven portable devices. For example, non-volatile memory often is utilized in digital audio players, digital cameras, mobile phones, and USB flash drives, which are used for general storage and transfer of data between computers.

Often, non-volatile memory devices, such as flash devices, are designed to utilize two different types of technology, NOR technology and NAND technology. NOR flash devices have long erase and write times, but have an input/output (I/O) interface that allows random access to any location in the memory. As a result, NOR flash devices typically are used for storing executable code, where the data that is stored is accessed in words or single instruction elements. Typically these accesses are to random locations because code execution often is non-sequential. This ability to fetch instructions from a flash device often is called "Execute in Place" (XIP).

NAND flash devices have faster erase/write times, higher density, and a lower cost per bit than NOR flash. However NAND flash devices have an I/O interface that allows only sequential access to data. As a result, NAND flash devices typically are used for storing data that is accessed in fixed sized pages. Typically these accesses are for a complete page of data. Although the read access time for a page is relatively slow for the first byte, the read access time for subsequent sequential bytes in the same page is extremely fast. Because of the inexpensive nature of the memory, NAND flash devices generally implement error correction code (ECC) functionality for data integrity.

Unlike many other storage devices, NAND flash devices cannot be overwritten. Instead, to update data in a particular storage location within flash memory, the location must first be erased, then the new data written in its place. Moreover, when erasing data in a flash device, an entire block must be erased instead of just the particular page or pages of the block that were updated. To facilitate this process, a typical flash controller will find a block of memory that has been previously erased and write the updated page to this new block at the same page offset. Then, the remaining pages of the old block are copied to the new block, as illustrated next in FIG. 1.

FIG. 1 is a diagram showing a prior art non-volatile memory system. In the example of FIG. 1, the non-volatile memory system is a flash system 100. The flash system 100 includes a flash device 102 having a plurality of blocks 104, with each block comprising a plurality of pages 106. The flash device 102 also includes a page buffer 108 for input/output (I/O) operations. Coupled to the flash device 102 is a flash controller 110, which is also coupled to a system data buffer 112.

To update the data in page 106a in block 104a, for example, the flash controller 110 locates a previously erased block, such as block 104b, in which to store the data from page 106a once updated. The data from page 106a is transferred to the page buffer 108. Then, the flash controller 110 reads the page 106a data from the page buffer 110 and writes the page 106a data to the system data buffer 112, where the data is updated. The flash controller 110 then reads the updated page 106a data from the system data buffer 112 and writes the updated page 106a data to the page buffer 108. The updated page 106a data then is written to the corresponding page 106a' in new block 104b.

Sometimes the page data is not read from page 106a because the host already has access to a page containing the updated information. In this case, the host sends a request for the updated page data to be written to memory, typically using a "WriteNewPage" command. In response, the flash controller 110 writes the updated page data to the page buffer 108. The updated page data then is written to the corresponding page 106a' in new block 104b.

Generally, while transferring the data to and from the flash controller, error correction code (ECC) logic is applied to the data to find and correct any correctable errors present in the data. After the updated data is stored in the new page 106a' of the new block 104b, the remainder of the pages from block 104a are transferred to the new block 104b, as illustrated next with reference to FIG. 2.

FIG. 2 is a diagram showing the prior art flash system 100 after transferring the remaining data in block 104a to the new block 104b. As above, the flash system 100 includes the flash device 102 having a plurality of blocks 104, with each block comprising a plurality of pages 106. The flash device 102 also includes a page buffer 108 for I/O operations. Coupled to the flash device 102 is the flash controller 110, which is also coupled to the system data buffer 112.

As mention above, the data in the remainder of the pages 106b of the block 104a needs to be transferred to the new block 104b. To improve flash system performance, the flash device 102 typically includes CopyBack functionality for data movement. A CopyBack command requests the flash device 102 to move the data in a page 106 from one location to the page with the same offset in another location internally within the flash device 102, without requiring the data to pass through flash controller 110 or the system data buffer 112.

Thus, the flash controller 110 issues a CopyBack command to the flash device 102 indicating the old and new locations for a page. The flash device 102 responds by moving the data from the old page location to the new page location. In the example of FIG. 2, the flash controller 110 issues a CopyBack command for each of the remaining pages 106b of block 104a indicating the corresponding page offset in the new block 104b. The flash device 102 then transfers the data from each page 106b to the corresponding page 106b' in the new block 104b. Thereafter, when time permits, the old block 104a can be erased. Unfortunately, the CopyBack command transfers the data without performing any ECC logic on the data.

The inexpensive nature of the NAND memory results in a chance for errors being introduced in the data when the data is written to or moved in flash memory. Moreover, as demand for greater functionality in devices has increased, so has demand for flash memory with greater storage capacity. To address such demands, multilevel-cell (MLC) flash memory has been developed. Single Level Cell (SLC) flash memory cells contain one bit of data in each memory cell. MLC memory cells contain two or more bits of data, thereby increasing the storage capacity of the device. Unfortunately, MLC flash memory is much less reliable than SLC flash memory.

Each time a page 106 of data is written to the flash device or moved from one location within the flash device 102 to another location within the flash device 102, there is a chance of a new error being introduced. Hence, the number of media defects accumulates as pages of data are moved from one block to another using the CopyBack data movement operation. As a result, if a page of data is moved enough times without being examined for errors, there is a substantial chance that what were once correctable errors become uncorrectable errors because of too many errors being introduced in the data.

In view of the foregoing, there is a need for systems and methods for providing data integrity when using the CopyBack command in a flash memory system. The systems and methods should reduce accumulated errors caused by CopyBack data transfer within the flash memory, yet still allow improved system performance through use of the CopyBack command.

SUMMARY OF THE INVENTION

Broadly speaking, the present invention addresses these needs by providing CopyBack data integrity in a non-volatile memory system using a CopyBack counter to ensure periodic data error analysis for CopyBack commands. In one embodiment, a method for providing CopyBack data integrity in a non-volatile memory system is disclosed. When the potential for moving data with a CopyBack command occurs, a counter corresponding to data in a block of data is examined. While the counter has not reached a predetermined limit, the counter is adjusted (ex., incremented) and data from the block of data is moved using a CopyBack command. However, when the counter reaches the predetermined limit, the counter is reset and data from the block of data is examined for errors. Generally, the block of data comprises a plurality of pages of data. Thus, when the counter has not reached the predetermined limit, data from at least one page is transferred to a corresponding page in a new block using a CopyBack command. Conversely, when the counter reaches the predetermined limit, data from at least one page is transferred to system memory and examined for errors. When an error is found, the error is corrected while the data is stored in system memory and the data is transferred to the corresponding page in the new block of the non-volatile memory after the error is corrected. Typically, the predetermined limit is based on the probability of accumulated defects exceeding the error correction capability of the non-volatile memory system.

In an additional embodiment, a non-volatile memory system capable of providing CopyBack data integrity is disclosed. The system includes a non-volatile memory that includes a plurality of blocks, with each block comprising a plurality of pages. In addition, the non-volatile memory is capable of moving a page of data from one block to another using a CopyBack operation. Coupled to the non-volatile memory is a non-volatile memory controller that is capable of examining a counter corresponding to a block in the non-volatile memory. The non-volatile memory controller includes logic that adjusts the counter and issues a CopyBack command to move data from the block to another block when the counter has not reached a predetermined limit. In addition, the non-volatile memory controller includes logic that resets the counter and transfers data from the block to system memory for error checking when the counter reaches the predetermined limit.

A further embodiment discloses a non-volatile memory controller capable of providing CopyBack data integrity in a non-volatile memory system. The non-volatile memory controller includes logic that examines a counter corresponding to a first block of data in a non-volatile memory. Logic is also included that adjusts the counter and issues a CopyBack command to move data from the first block to a second block in the non-volatile memory when the counter has not reached a predetermined limit. The non-volatile memory controller also includes logic that resets the counter and transfers data from the first block to system memory for error checking when the counter reaches the predetermined limit. Generally, the non-volatile memory controller issues a CopyBack command to transfer data from a page in the first block to a corresponding page in the second block when the counter has not reached the predetermined limit. When the counter reaches the predetermined limit, the non-volatile memory controller transfers data from a page in the first block to system memory. In this case, the data is checked for errors and, when an error is found, the error is corrected while the data is stored in system memory. After the error is corrected, the non-volatile memory controller transfers the data to a corresponding page in the second block. As will be described in greater detail subsequently, a separate counter is maintained for data stored in each block of memory. In this manner, embodiments of the present invention reduce error accumulation in non-volatile memory caused by data movement via CopyBack commands. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for providing CopyBack data integrity in a non-volatile memory system. Broadly speaking, embodiments of the present invention utilize a CopyBack counter associated with data from a block to indicate the number of times the data has been moved using a CopyBack command. Each time data is moved from one block to another using a CopyBack data movement operation, the CopyBack counter is incremented. Once the CopyBack counter reaches a predetermined limit, the next CopyBack command is replaced with a data movement operation that checks each page data for errors and corrects any errors prior to moving the data to the new location. Thereafter, the CopyBack counter associated with the data is reset.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
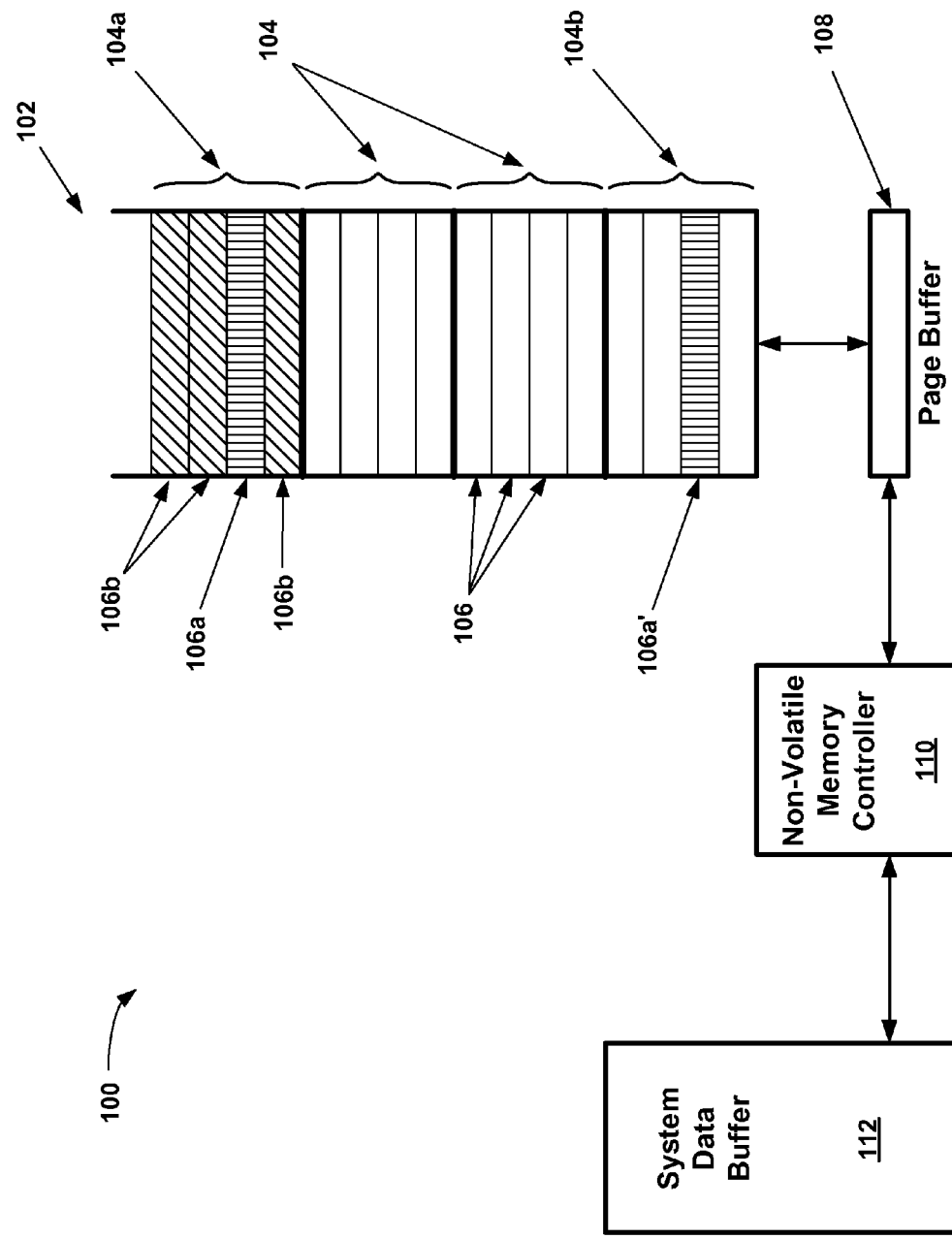
FIG. 1 is a diagram showing a prior art non-volatile memory system.
Figure 2:
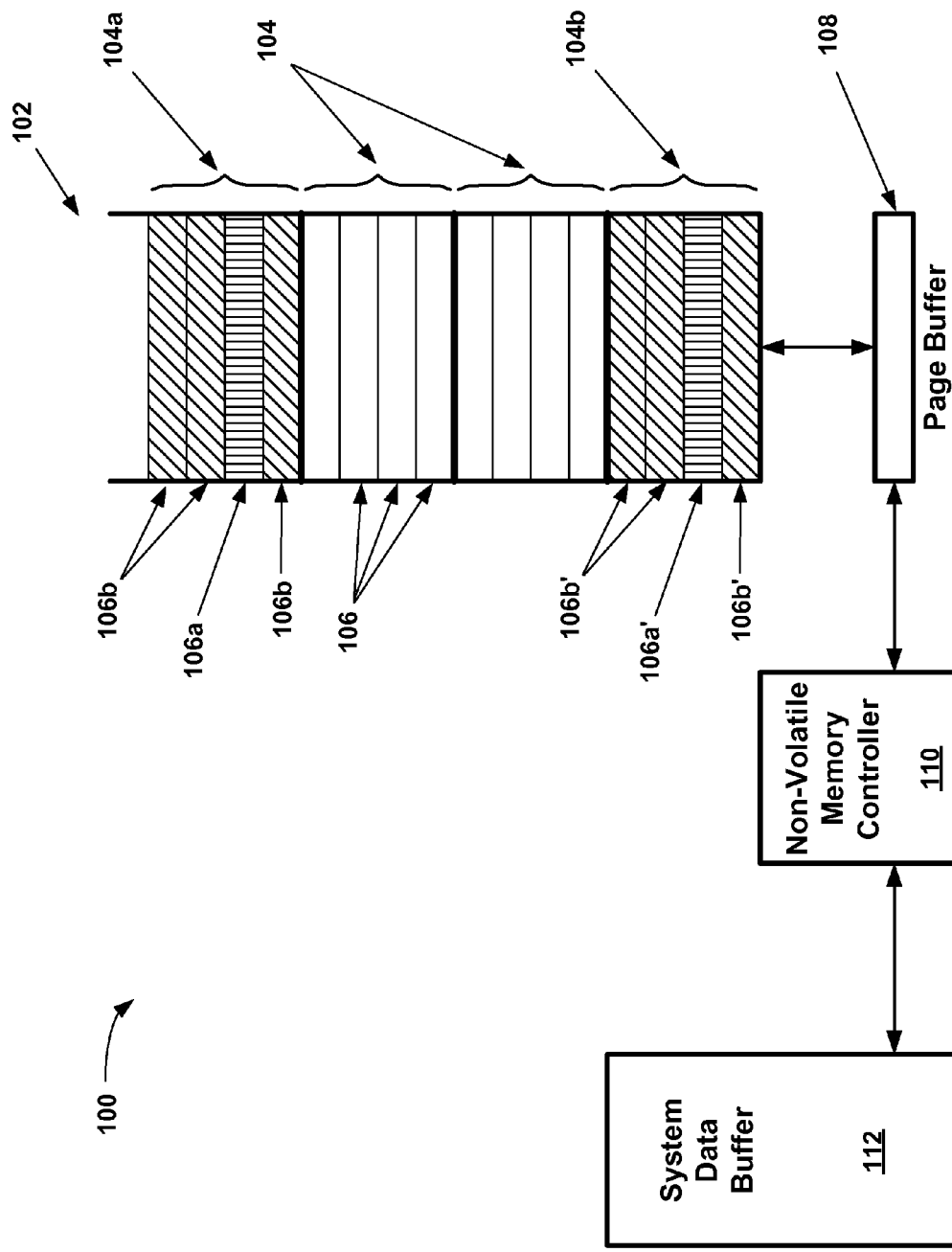
FIG. 2 is a diagram showing the prior art non-volatile memory system after transferring the remaining data in block data to the new block.
Figure 3:
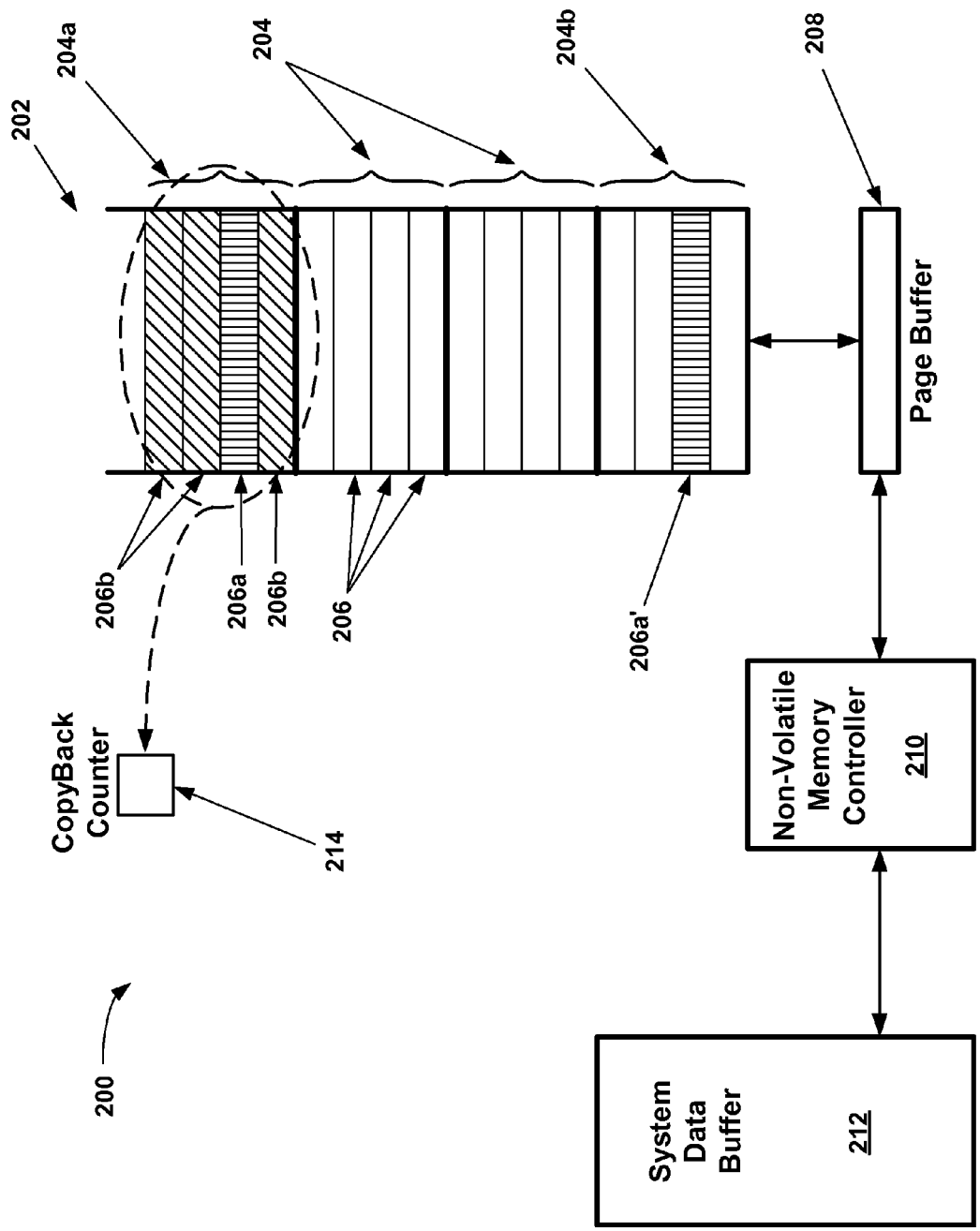
FIG. 3 is a diagram showing a non-volatile memory system having CopyBack data integrity functionality, in accordance with an embodiment of the present invention.

FIGS. 1 and 2 were described in terms of the prior art. FIG. 3 is a diagram showing a non-volatile memory system 200 having CopyBack data integrity functionality, in accordance with an embodiment of the present invention. The non-volatile memory system 200 includes a non-volatile memory 202 having a plurality of blocks 204, with each block comprising a plurality of pages 206. Associated with the data for each block 204 is a CopyBack counter 214, which will be incremented with each CopyBack operation performed on the data. The non-volatile memory 202 also includes a page buffer 208 for input/output (I/O) operations. Coupled to the non-volatile memory 202 is a non-volatile memory controller 210, which is also coupled to a system data buffer 212.

To update the data in page 206a in block 204a, for example, the non-volatile memory controller 210 locates a previously erased block, such as block 204b, in which to store the data from page 206a once updated. The data from page 206a is transferred to the page buffer 208. Then, the non-volatile memory controller 208 reads the page 206a data from the page buffer 210 and writes the page 206a data to the system data buffer 212, where the data is updated. The non-volatile memory controller 210 then reads the updated page 206a data from the system data buffer 212 and writes the updated page 206a data to the page buffer 208. However, sometimes the page data is not read from page 206a because the host already has access to a page containing the updated information. In this case, the host sends a request for the updated page data to be written to memory, typically using a "WriteNewPage" command. In response, the flash controller 210 writes the updated page data to the page buffer 208. Either way, once the updated page data is in the page buffer 208, the updated page 206a data then is written to the corresponding page 206a' in new block 204b. Generally, while transferring the data to and from the non-volatile memory controller, error correction code (ECC) logic is applied to the data to find and correct any correctable errors present in the data.

After the updated data is stored in the new page 206a' of the new block 204b, the remainder of the pages from block 204a are transferred to the new block 204b. However, before transferring the remainder of the pages using a CopyBack command, embodiments of the present invention check the CopyBack counter 214 associated with the data in block 204a to determine if the CopyBack counter 214 has reached a predetermined limit.

As mentioned above, the inexpensive nature of NAND memory results in a chance for errors being introduced in the data when the data is moved in non-volatile memory. Moreover, MLC memory, which increases storage capacity by containing two or more bits of data, is much less reliable than SLC memory. Thus, each time a page 206 of data is moved from one location within the non-volatile memory device 202 to another location within the non-volatile memory device 202, there is a chance of a new error being introduced. Hence, the number of media defects accumulates as pages of data are moved from one block to another using the CopyBack data movement operation. As a result, if a page of data is moved enough times without being examined for errors, there is a substantial chance that data that was free of defects or that once contained correctable errors becomes uncorrectable because of too many errors being introduced in the data. For example, if an error is present in page 206a, that error gets moved to page 206a' when using the CopyBack data movement operation. If another error is introduced in the data in page 206a', there are now two errors in page 206a'

To address this issue, embodiments of the present invention associate a CopyBack counter 214 with the data in each block 204. That is, a plurality of CopyBack counters 214 is included in the system. In one embodiment, each CopyBack 214 counter is associated with a logical address of the data. Thus, when the data is moved from block to block, the logical address, and thus the CopyBack counter 214, continues to be associated with the data.

Each CopyBack counter 214 indicates the number of times the associated data has been moved using a CopyBack command without being checked for errors. More specifically, prior to moving the data using a CopyBack command, the Copyback counter 214 associated with the data is checked to determine if it has reached a predetermined limit. If the counter has not reached the predetermined limit, the data is moved using a CopyBack command, as illustrated next with reference to FIG. 4.

Figure 4:
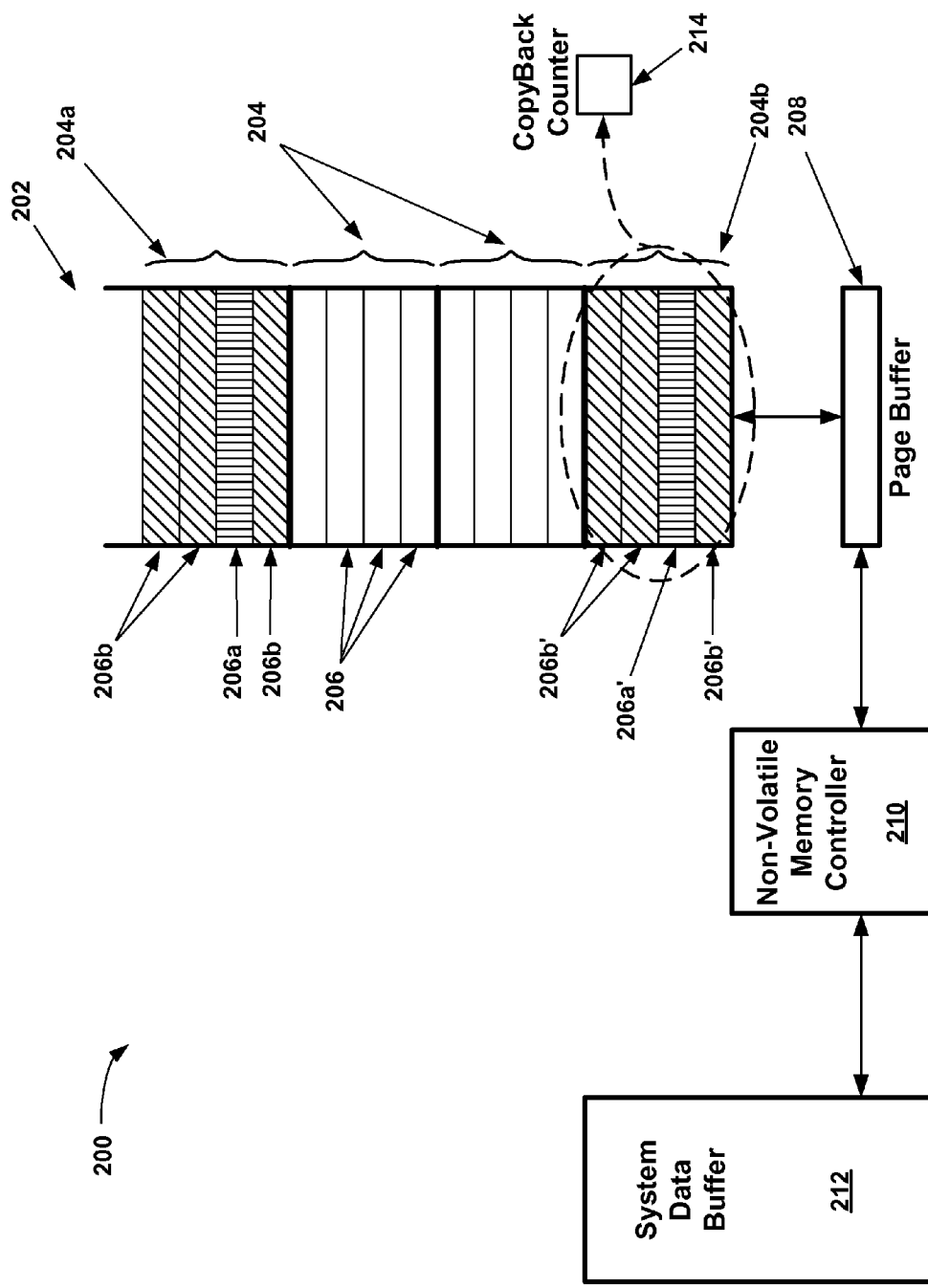
FIG. 4 is a diagram showing the non-volatile memory system wherein the CopyBack counter associated with the data in block has not reached the predetermined limit, in accordance with an embodiment of the present invention.

FIG. 4 is a diagram showing the non-volatile memory system 200 wherein the CopyBack counter 214 associated with the data in block 204a has not reached the predetermined limit, in accordance with an embodiment of the present invention. As mentioned above, in the example of FIG. 4, the CopyBack counter 214 associated with the data in block 204a has not reached the predetermined limit. As a result, the remaining pages 206b of block 204a are copied to the new block 204b using CopyBack commands. That is, the non-volatile memory controller 210 issues a CopyBack command for each of the remaining pages 206b of block 204a indicating the corresponding page offset in the new block 204b in which to transfer the page 206b data. The non-volatile memory device 202 then transfers the data from each page 206b to the corresponding page 206b' in the new block 204b. In addition, the CopyBack counter 214 associated with the data is incremented. Thus, in the example of FIG. 4, the CopyBack counter 214 associated with the data in block 204b is incremented to indicate that a CopyBack operation has been performed on the data. Thereafter, when time permits, the old block 204a can be erased.

As mentioned above, if a page of data is moved enough times without being examined for errors, there is a substantial chance that data that was free of defects or that once contained correctable errors becomes uncorrectable because of too many errors being introduced in the data. Therefore, embodiments of the present invention designate a predetermined limit number as the maximum number of times a page of data can be moved using a CopyBack operation without being checked for errors. In one embodiment, the limit number is determined based on the probability of accumulated defects exceeding the ECC correction capability of the non-volatile memory system 200. That is, the limit number is determined based on the probability of errors occurring in the storage media and the capability of the ECC logic to correct the errors.

Figure 5:
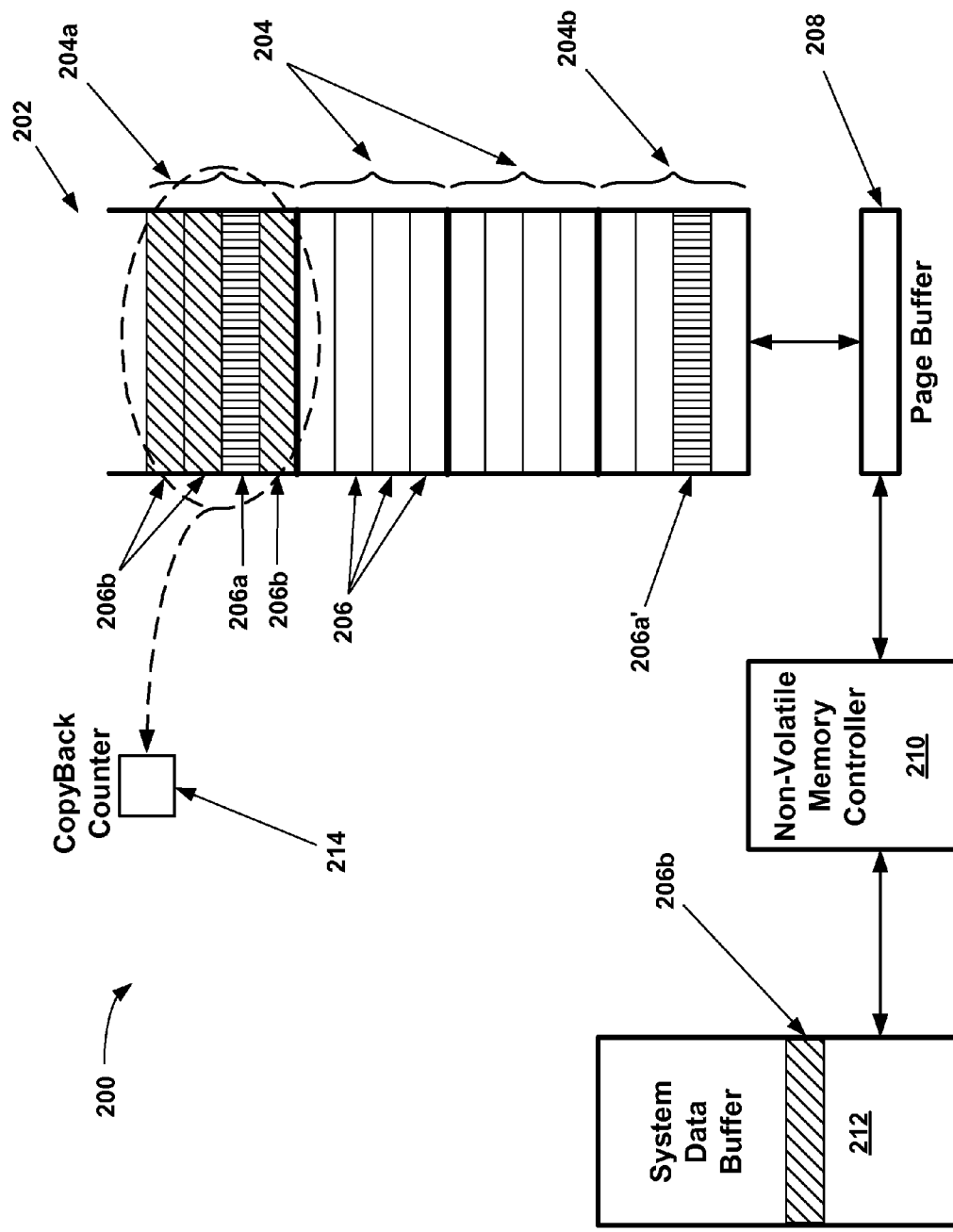
FIG. 5 is a diagram showing the non-volatile memory system wherein the CopyBack counter associated with the data in block has reached the predetermined limit, in accordance with an embodiment of the present invention.

FIG. 5 is a diagram showing the non-volatile memory system 200 wherein the CopyBack counter 214 associated with the data in block 204a has reached the predetermined limit, in accordance with an embodiment of the present invention. Since, in the example of FIG. 5, the CopyBack counter 214 associated with the data in block 204a has reached the predetermined limit, the remaining pages 206b of block 204a are not copied to the new block 204b using CopyBack commands.

Instead, the data in each of the remaining pages 206b of block 204a is transferred to the system data buffer 212 and checked for errors. For example, to transfer the data in a remaining page 206b of block 204a, the page 206b data is first transferred to the page buffer 208. The non-volatile memory controller 210 then reads the page 206b data from the non-volatile memory buffer 208 and stores the page 206b data in the system data buffer 212.

While the page 206b data is being transferred to the system data buffer 212, ECC logic is applied to the page 206b data to determine if any errors are present in the data. If errors are found, error correction logic is applied to the page 206b data stored in the system data buffer 212 to correct the errors. That is, the error correction logic calculates a correction pattern and offset to any found errors and applies the correction to the defective page 206b data stored in the system data buffer 212. It should be noted, however, that the error correction logic can be applied to the data while inside the non-volatile memory controller 210, instead of in the system data buffer 212. Generally, a correction pattern is a bit pattern that when applied at the calculated offset corrects the error or errors in the defective data. Once the data is checked for errors, and any found errors are corrected, the page 206b data is stored in the non-volatile memory device 202, as discussed next with reference to FIG. 6.

Figure 6:
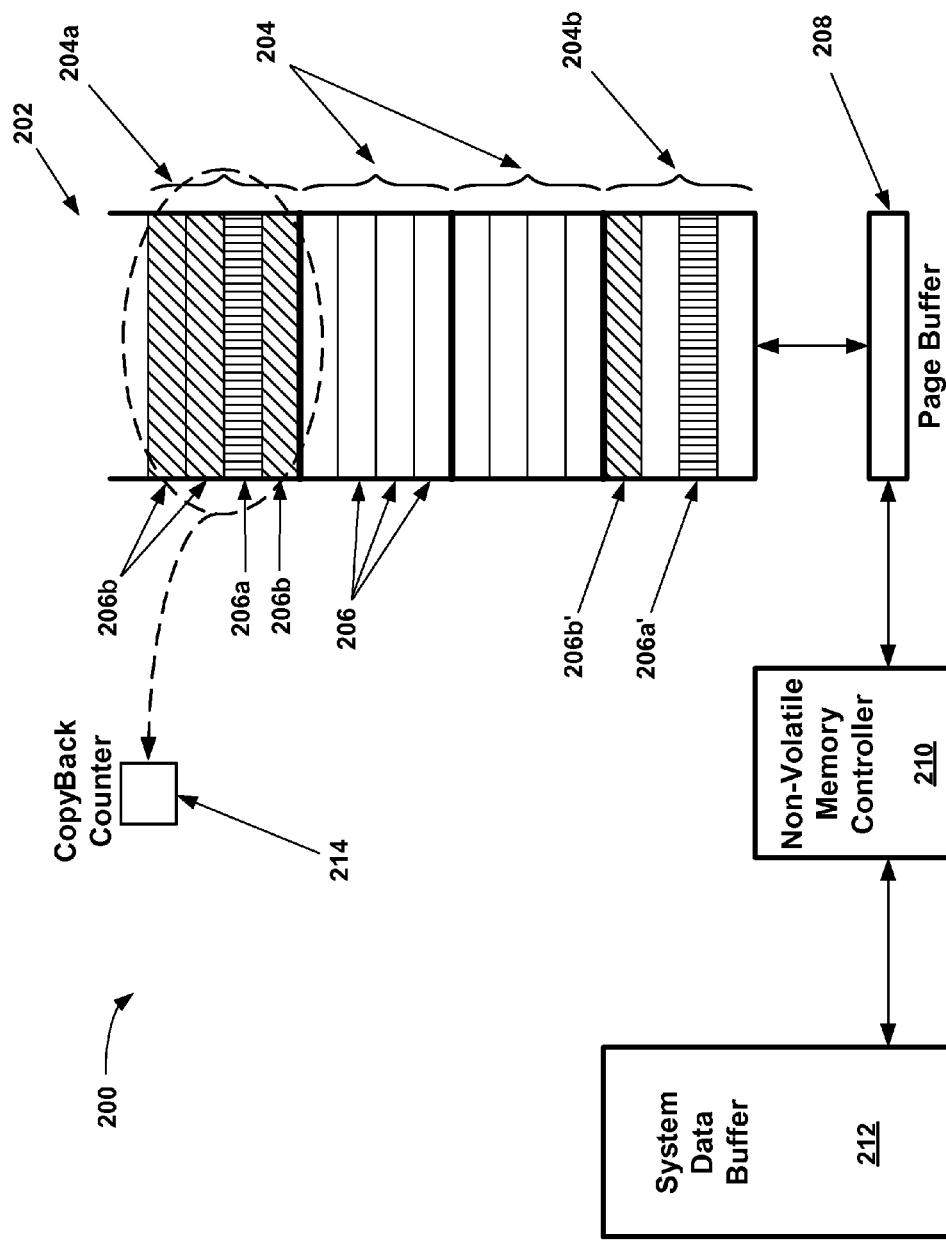
FIG. 6 is a diagram showing the non-volatile memory system wherein a remaining page of data is transferred without using a CopyBack command in order to check the page data for errors, in accordance with an embodiment of the present invention.

FIG. 6 is a diagram showing the non-volatile memory system 200 wherein a remaining page of data is transferred without using a CopyBack command in order to check the page data for errors, in accordance with an embodiment of the present invention. Once the page 206b data is checked for errors, and any found errors are corrected, the non-volatile memory controller 210 transfers the page 206b data to the non-volatile memory buffer 208. The page 206b data then is stored in the corresponding page 206b' of the new block 204b. The process then is repeated for each of the remaining pages 204b in the block 204a, as illustrated in FIG. 7.

Figure 7:
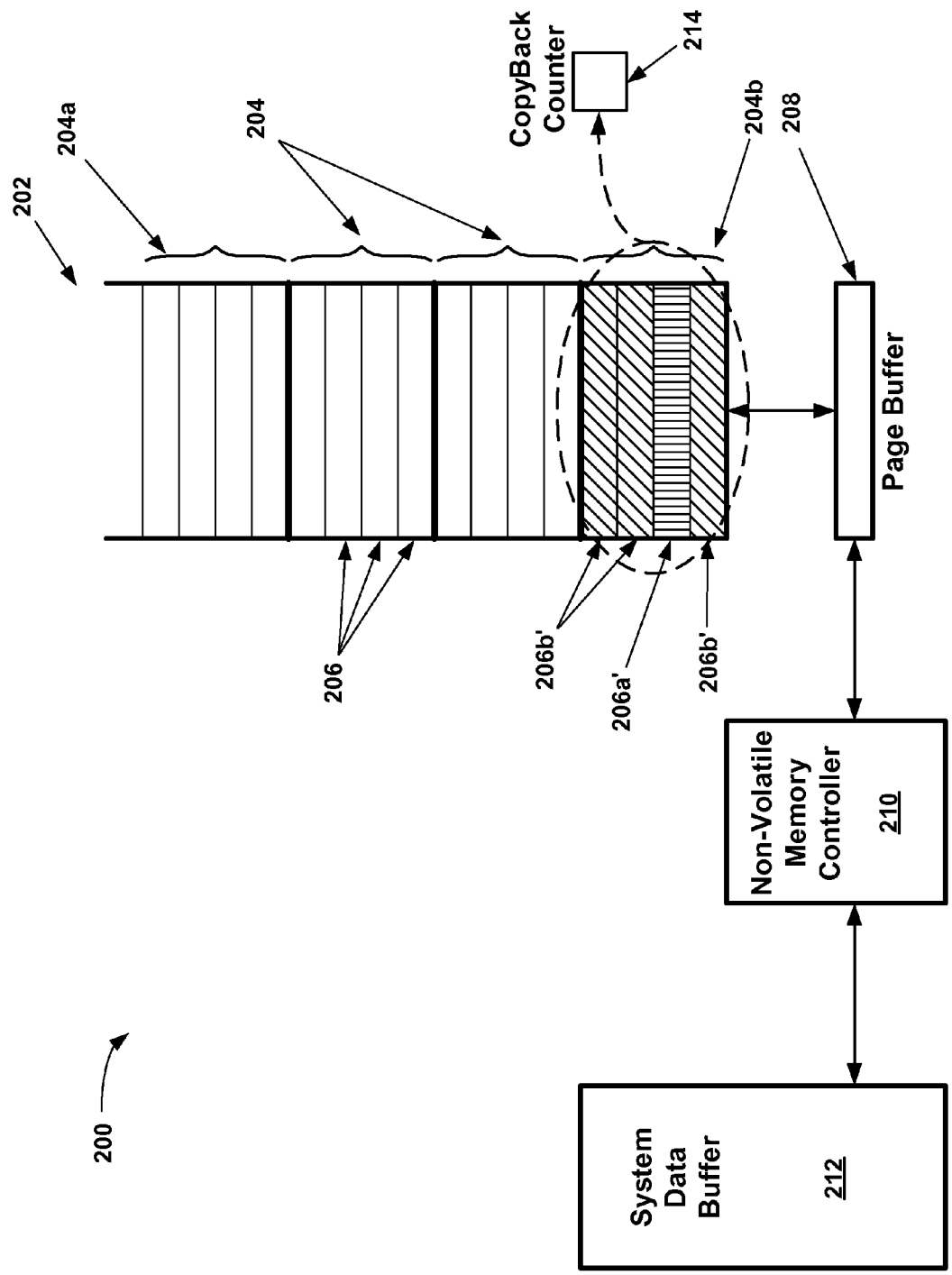
FIG. 7 is a diagram showing the non-volatile memory system wherein all remaining pages of data are transferred to the new block without using a CopyBack command and the old block erased, in accordance with an embodiment of the present invention.

FIG. 7 is a diagram showing the non-volatile memory system 200 wherein all remaining pages of data are transferred to the new block 204a without using a CopyBack command and the old block 204a erased, in accordance with an embodiment of the present invention. In addition, the CopyBack counter 214 associated with the data is reset when the remaining block data is moved without using CopyBack commands. Thus, in the example of FIG. 7, the CopyBack counter 214 associated with the data in block 204b is reset to indicate that all the existing pages have been checked for errors and ECC logic has been performed on the block data if there were any errors discovered. Thereafter, when time permits, the old block 204a can be erased, as shown in FIG. 7.

Thus, embodiments of the present invention utilize the CopyBack counter 214 to indicate the number of times a page of data has been transferred using CopyBack commands without ECC logic being applied to the data. Once ECC logic is applied to the data, the CopyBack counter 214 is reset to indicate no CopyBack commands have been used on the data since the last time ECC logic was applied to the data.

In one embodiment, after performing the CopyBack command, if the new value of the incremented CopyBack counter 214 has reached the predetermined limit, each page is read from the new location and tested for errors. If there is now an error, this is from accumulation (and probably from this recent movement). Since the old block has not yet been erased, another method for recovery can be used. Here, another free block can be found, and the new page(s) copied to the free block. Then, perform CopyBack operations for all the remaining pages from the original block, and erase the block that contained the defective data.

Figure 8:
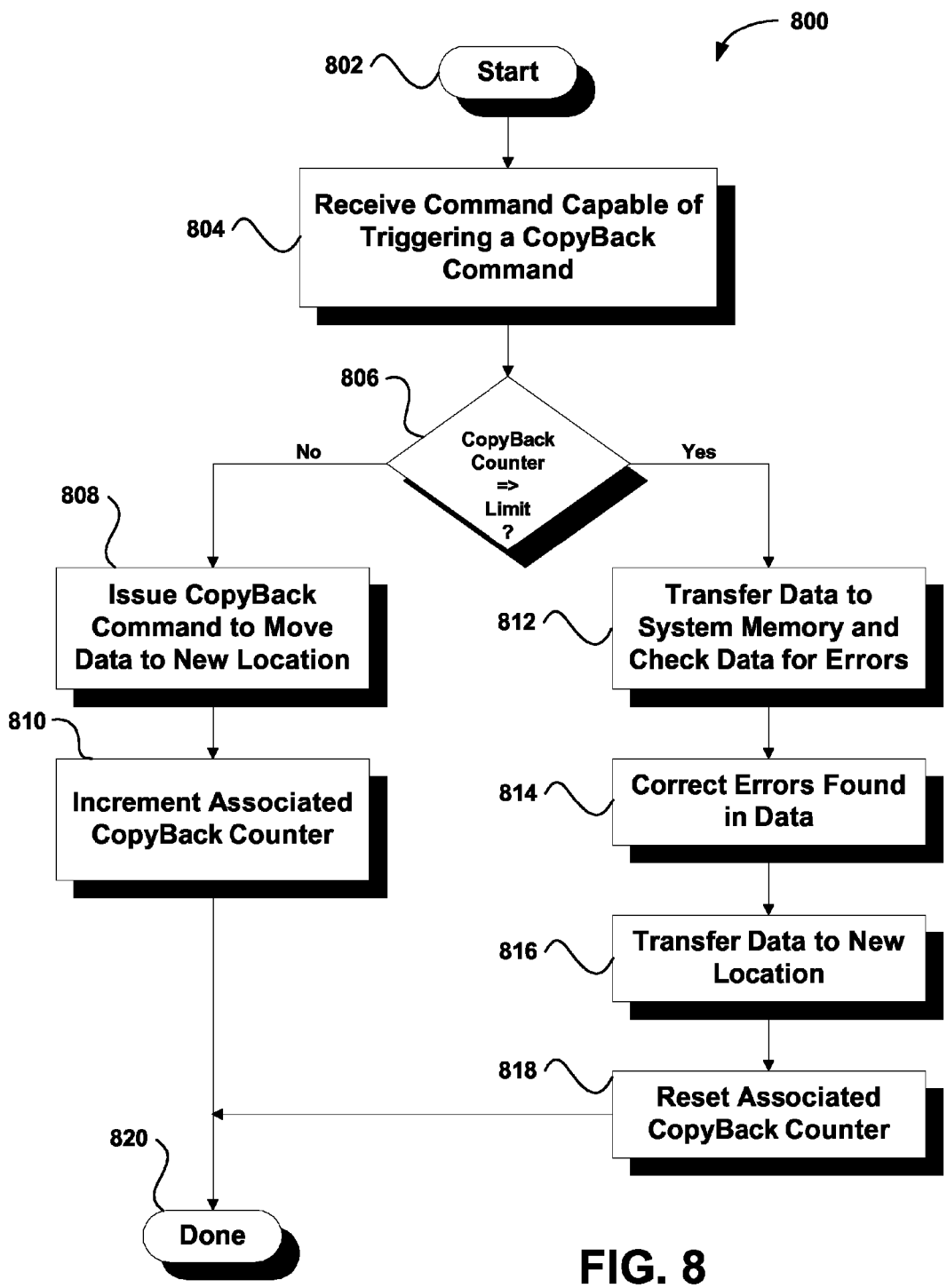
FIG. 8 is flowchart showing a method for providing Copy-Back data integrity in a non-volatile memory system, in accordance with an embodiment of the present invention.

FIG. 8 is flowchart showing a method 800 for providing CopyBack data integrity in a non-volatile memory system, in accordance with an embodiment of the present invention. In an initial operation 802, preprocess operations are performed. Preprocess operations can include, for example, updating a page of data in an old block, transferring the updated data to a new, previously erased block, and other preprocess operations that will be apparent to those skilled in the art after a careful reading of the present disclosure.

In operation 804, a command is received that is capable of triggering a CopyBack command. In general, commands from the processor to updated data within a page of non-volatile memory will trigger possible CopyBack commands for the other pages in the same block. As mentioned above, NAND non-volatile memory devices cannot be overwritten. Instead, to update data at a particular storage location within non-volatile memory, a typical non-volatile memory controller will find a block of memory that has been previously erased and write the updated page to this new block at the same page offset. Then, the remaining pages of the old block are copied to the new block using CopyBack commands. However, embodiments of the present invention check the number of times data has been moved using CopyBack commands before using another CopyBack command to move the data.

Hence, in operation 806, the CopyBack counter associated with the data proposed to be moved using a CopyBack command is compared to a predetermined limit. As mentioned above, each time a page of data is moved from one location within the non-volatile memory device to another location within the non-volatile memory device, there is a chance of a new error being introduced. As a result, if a page of data is moved enough times without being examined for errors, there is a substantial chance that data that was free of defects or that once contained correctable errors becomes uncorrectable because of too many errors being introduced in the data.

To address this issue, embodiments of the present invention associate a CopyBack counter with the data in each block of non-volatile memory. Each CopyBack counter indicates the number of times the associated data has been moved using a CopyBack command without being checked for errors. If the CopyBack counter is greater than the predetermined limit, the method 800 branches to operation 812. Otherwise the method 800 continues to operation 808.

In operation 808, CopyBack commands are issued to move the page data from the present locations to corresponding new locations in the new block. More specifically, the non-volatile memory controller issues a CopyBack command for each of the remaining pages of the old block indicating the corresponding page offset in the new block in which to transfer each page of data. The non-volatile memory device then transfers the data from the present pages to the corresponding pages in the new block.

Once all the remaining pages in the old block are transferred to the new block, the CopyBack counter associated with the data is incremented. As mentioned above, if a page of data is moved enough times without being examined for errors, there is a substantial chance that what were once correctable errors become uncorrectable errors because of too many errors being introduced in the data. Therefore, embodiments of the present invention designate a predetermined limit number as the maximum number of times a page of data can be moved using a CopyBack operation without being checked for errors.

Thus, when the CopyBack counter is equal to or greater than the predetermined threshold limit, the page data is transferred to system memory and checked for errors. Since the CopyBack counter associated with the data in block has reached the predetermined threshold, the remaining pages are not copied to the new block using CopyBack commands. Instead, the data in each of the remaining pages of block is transferred to the system data buffer and checked for errors. In particular, each page of data is first transferred to the page buffer. The non-volatile memory controller then reads the page data from the non-volatile memory buffer and stores the page data in the system data buffer. While the page data is being transferred to the system data buffer, ECC logic is applied to the page data to determine if any errors are present in the data.

Any errors found in the page data then are corrected, in operation 814. If errors are found, error correction logic is applied to the page data stored in the system data buffer to correct the errors. The error correction logic calculates a correction pattern and offset to any found errors and applies the correction to the defective page data stored in the system data buffer. The data is then transferred to the new location in the new block, in operation 816. The process then is repeated for each of the remaining pages in the block.

In operation 818, the CopyBack counter associated with the data is reset. Embodiments of the present invention utilize the CopyBack counter to indicate the number of times the associated data has been transferred using CopyBack commands without ECC logic being applied to the data. Once ECC logic is applied to the data, the CopyBack counter is reset to indicate no CopyBack commands have been used on the data since the last time ECC logic was applied to the data. Post process operations are then performed in operation 820. Post process operations can include, for example, updating the address mapping data, receiving further commands from the host system, and other post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. For example, the counter(s) can be initialized to a predetermined value and decremented until they reach zero or any other preferred value. Accordingly, the present embodiments are to be considered as illustrative and not restrictive, and the invention is not to be limited to the details given herein, but may be modified within the scope and equivalents of the appended claims.

What is claimed is:

1. A method for copying data of a block of data having a plurality of pages within a non-volatile memory system comprising a non-volatile memory, a non-volatile memory controller and a processor, each in communication with one another and configured to provide CopyBack data integrity, comprising:

locating, using the memory controller, a first location block to store a first page from the data of the block of data;

transferring data from the first page to a buffer and storing the transferred data as updated data of the first page to a corresponding page in the first location block;

examining a copyback counter corresponding to data in the block of data;

moving, using the non-volatile memory, one or more remaining pages of data of the block of data to one or more corresponding pages associated with each of the one or more remaining pages of data of the block of data in the first location block, wherein remaining pages is data of the first block less the first page, in accordance with:

where a value of the copyback counter is less than a predetermined limit value, copying the one or more remaining pages of data of the block of data to one or more corresponding pages associated with each of the one or more remaining pages of data of the block of data in the first location block using copyback commands, and incrementing the value of the copyback counter forward; and where the value of the copyback counter is greater than or equal to the predetermined limit value, transferring the one or more remaining pages of data of the block of data to the buffer; applying error correction logic to the transferred one or more remaining pages of data of the block of data having errors as determined by first applying error logic thereto; storing corrected one or more remaining pages of data of the block of data in the memory device; and resetting the copyback counter.

2. The method as recited in claim 1, wherein the block of data comprises at least a plurality of pages of data and the method is performed in response to an operational command.

3. The method as recited in claim 2, wherein the operational command is a copy command.

4. The method of claim 1, wherein the first location block is a previously erased block of the non-volatile memory.

5. The method of claim 4, wherein the step of transferring data from the first page to a buffer includes the buffer being a page buffer and further includes the steps of: writing the data from the first page to a system data buffer as the updated data of the first page; reading, using the non-volatile memory controller, the updated data of the first page from the system data buffer; writing the updated data of the first page to the page buffer; and storing the updated data of the first page to a corresponding page in the first location block.

6. The method of claim 5, wherein the step of moving where the value of the copyback counter is greater than or equal to the predetermined limit value, includes the buffer being a page buffer and further includes reading the transferred one or more pages of data using the memory controller; and storing the one or more remaining pages of data of the block of data in the system data buffer.

7. The method of claim 6, wherein the memory device further comprises the non-volatile memory including the page buffer for input/output operations coupled with the non-volatile memory controller and the system data buffer.

8. A non-volatile memory system comprising: a non-volatile memory is capable of being electrically erased and reprogrammed and a non-volatile memory controller configured to provide CopyBack data integrity, comprising:

the non-volatile memory having one or more of blocks, each block comprising a plurality of pages of data, the non-volatile memory being configured to moving a first page of data from a first block to a second block using a CopyBack operation, wherein remaining data is data of the first block less the first page; and the non-volatile memory controller coupled to the non-volatile memory, being configured to examine a counter corresponding to remaining data stored in the first block, having logic that:

(a) determines whether the counter has a value equal to a predetermined limit value, and further having logic that upon a condition in which the counter value is determined to have not reached the predetermined limit value, thereafter copying the remaining data to one or more corresponding pages associated with the remaining data stored in the first block using copyback commands, and incrementing the value of the copyback counter forward and (b) determines whether the counter has a value that has reached or exceeded the predetermined value, thereafter transferring the remaining data to a buffer; applying error correction logic to the transferred remaining data having errors as determined by first applying error logic thereto; storing corrected remaining data in the memory device; and resetting the counter.

9. The non-volatile memory system of claim 8, wherein the non-volatile memory controller issues a CopyBack command to transfer remaining data from at least one page of the remaining data to a corresponding page in the second block when the counter value has not reached the predetermined limit value.

10. The non-volatile memory system of claim 8, wherein the non-volatile memory controller transfers data from at least one page of the remaining data to system memory when the counter value reaches the predetermined limit value.

11. The non-volatile memory system of claim 10, wherein an error in the data from the at least one page of the remaining data is corrected while stored in system memory.

12. The non-volatile memory system of claim 11, wherein the non-volatile memory controller transfers the data from the at least one page of the remaining data to a corresponding page in second block of the non-volatile memory device after the error is corrected.

13. The non-volatile memory system of 8, wherein the predetermined limit value is based on a probability of accumulated defects exceeding an error correction capability of the non-volatile memory system.

14. A non-volatile memory controller system comprising: a non-volatile memory and a non-volatile memory controller configured to provide CopyBack data integrity, comprising:

the non-volatile memory having one or more blocks, each block comprising a plurality of pages of data, wherein the memory is capable of being electrically erased and reprogrammed;

a plurality of ports utilized for input or output operations;

the non-volatile memory controller in communication with the non-volatile memory having logic that:

locating, using the controller, a first location block to store a first page from the data of the block of data;

transferring data from the first page to a buffer and storing the transferred data as updated data of the first page to a corresponding page in the first location block;

examining a copyback counter corresponding to data in the block of data;

moving one or more remaining pages of data of the block of data to one or more corresponding pages associated with each of the one or more remaining pages of data of the block of data in the first location block, wherein remaining pages is data of the first block less the first page, in accordance with:

where a value of a copyback counter is less than a predetermined limit value, copying the one or more remaining pages of data of the block of data to one or more corresponding pages associated with each of the one or more remaining pages of data of the block of data in the first location block using copyback commands, and incrementing the value of the copyback counter forward; and where the value of the copyback counter is greater than or equal to the predetermined limit value, transferring the one or more remaining pages of data of the block of data to the buffer; applying error correction logic to the transferred one or more remaining pages of data of the block of data having errors as determined by first applying error logic thereto; storing corrected one or more remaining pages of data of the block of data in the memory device; and resetting the copyback counter.

15. The non-volatile memory controller system of claim 14, wherein the non-volatile memory controller issues a CopyBack command to transfer the data of the one or more remaining pages of data of the block of data from a page in the first block to a corresponding page in the second block when the value of the counter has not reached the predetermined limit value.

16. The non-volatile memory controller system of claim 14, wherein the non-volatile memory controller transfers the data of the one or more remaining pages of data of the block of data from a page in the first block to system memory when the co value of the counter reaches the predetermined limit value.

17. The non-volatile memory controller system of claim 16, wherein an error in the data of the one or more remaining pages is corrected while the data is stored in system memory.

18. The non-volatile memory controller system of claim 17, wherein the non-volatile memory controller transfers the data of the one or more remaining pages to a corresponding page in the second block after the error is corrected.

19. The non-volatile memory controller system of claim 14, wherein the predetermined limit value is determined in relation to a probability of accumulated defects exceeding an error correction capability of the non-volatile memory system.

20. The non-volatile memory controller system of claim 19, wherein a separate counter is maintained for data stored in each page of memory.

* * * * *